United States Patent Office 3,459,574
Patented Aug. 5, 1969

3,459,574
OPACIFYING PIGMENT GLASS COMPOSITION
Oswin B. Willcox, Kenneth M. Kolb, and Rajnikant B. Amin, Wilmington, Del., assignors to E. I. du Pont de Nemours and Company, Wilmington, Del., a corporation of Delaware
No Drawing. Continuation-in-part of application Ser. No. 412,868, Nov. 20, 1964. This application Feb. 23, 1966, Ser. No. 529,253
Int. Cl. C09c 1/36; C03c 5/02, 3/04
U.S. Cl. 106—300                                 8 Claims

ABSTRACT OF THE DISCLOSURE

On opacifying pigment, the particles composed of a glass matrix having therein 10 to 35 percent by volume of recrystallized, stabilized opacifying oxide of a metal such as titanium, the particle size of the glass and oxide of titanium being, respectively, 1 to 60 microns and 0.01 to 1.0 micron.

---

This invention relates to new inorganic composite pigments and to novel methods for their preparation. More particularly, it relates to novel composite $TiO_2$ and $ZrO_2$ pigments, the $TiO_2$ and $ZrO_2$ components of which are dispersed and stabilized in a glass matrix.

This application is a continuation-in-part of our copending U.S. application Ser. No. 412,868 filed Nov. 20, 1964 and now abandoned.

This invention provides a highly useful pigment for paint and paper use. An ideal white pigment for use in these applications must possess good covering power and high opacity and tinting strength. In addition, it should be fine in particle size, chemically inert, free of soluble salts, and insoluble in all media used and remain unaffected by normal temperature conditions. Also, it should be readily dispersable, nontoxic and exhibit low oil adsorption characteristics. Titanium dioxide pigments in rutile and anatase crystal form approach this ideal more economically than other pigmenting substances, and hence are widely used to develop hiding power and brightness in coated products. The preferred products of this invention contain light scattering particles of $TiO_2$, preferably not less than 80% of which are in the rutile crystalline form, enclosed in a particulate inert glass matrix. These products particularly improve over existing white pigments in hiding power efficiency and inertness. This new class of pigments appears to be best utilizable in extended paint and film formulations wherein some or all of the extender is replaced by this new pigment and in systems where the conventional pigment is normally poorly dispersed, i.e. in paper. Preferably, it comprises a particulate solid transparent glass system of refractive index between 1.46 and 1.65, measuring about 1–60 microns average diameter to pass through a U.S. Series No. 230 mesh screen and preferably at least 25% in the range 2–15 micron average diameter to all past U.S. Series No. 325 mesh, with the opacifying titanium oxide particles present having average diameters of from 0.01 to 1.0 micron and preferably in the range of 0.1 to 0.3 micron effectively and uniformly dispersed by recrystallization in a glass matrix. The volume percent of recrystallized $TiO_2$ in the glass matrix ranges from 10% to 35%, and preferably ranges from 15–30%. The weight percent $TiO_2$ present as recrystallized particles is at least 70% and preferably ranges from 90 to 100% of the total $TiO_2$ contained in the system. This uniform dispersion is stabilized in the glass matrix which serves to protect the $TiO_2$ particles against weathering and enhances pigment inertness. Consequently, such glass encased pigment is patricularly advantageous for use in those applications where dispersion is difficult to obtain and weatherability is a limitation. When used in paper and interior flat wall paints and in exterior paints the pigment provides an important contribution to the art.

Our pigmentary product is prepared by a heat treatment to induce nucleation and precipitation of a $TiO_2$ rich phase from a metastable solution contained in a quenched glass composition, thereafter the product is subjected to further crystal growth heat treatment under controlled calcination temperatures, to form an opacifying pigmentary $TiO_2$ phase, and the opacified material is then ground to reduce its particle size to desired fineness for the intended use. In consequence of such treatment, the $TiO_2$ component is advantageously recrystallized during the calcination and is stabilized to desired pigmentary size, concentration, and distribution in the glass matrix. Upon subsequent milling of the matrix, production is assured of an improved glass encapsulated pigment highly useful in various pigmenting applications such as flat and other type paints, enamels and similar protective coatings, as well as in the manufacture of paper, films, plastics, rubber and textile fibers.

The opacity of white pigments such as $TiO_2$ is a result of diffuse reflection, refraction and scattering of the greater part of incident visible light. The efficiency in opacification (hiding power) is a function of the concentration of the pigment and the size and the dispersion or spacing of the pigment particles in the media in which the pigment is employed. In many conventional pigment applications, flocculation and agglomeration or crowding of the pigment particles occurs to induce undesired loss of opacifying efficiency. This may amount to as much as 70% loss of that opacification obtainable under ideal conditions. According to our invention the opacifying, especially rutile $TiO_2$, pigment particles advantageously are recrystallized in the glass matrix to obtain and provide theoretical optimum hiding power properties and preferably a product having interparticle distances between one half and one quarter the wavelength of the light to be reflected. For this reason, the pigment volume concentration of the recrystallized titanium dioxide in the glass matrix is seldom above 25% (40% by weight) and has higher efficiency in the range of 10–15% (16–24% by weight). The use of such matrix pigment in, for example, paint and paper manufacture cannot result in undesired overcrowding of any substantial amount of the $TiO_2$ or $ZrO_2$ pigment particles because they are locked into position within the glass particles. Paint films containing our novel pigmenting material will consist of a binder (refractive index up to 1.6) containing pigment particles suitably encased, dispersed and stabilized in glass, and may contain additional free $TiO_2$ of a conventional pigment type.

The great difference in refractive index between the pigment particle and the matrix, the greater will be the light scattering or hiding of that particle, thus we prefer a glass matrix of refractive index between 1.46 and 1.65. Since $TiO_2$ dissolved in a glass matrix will excessively raise the refractive index of the matrix, it is essential in this invention that the fraction of $TiO_2$ recrystallized from the matrix be maximized and the residual solubilized $TiO_2$ be held to a low level. In order to privide a matrix of suitable refractive index, it is necessary to recrystallize at least 70% and preferably over 90% of the dissolved $TiO_2$. For useful glasses, the residual dissolved $TiO_2$ should not exceed 16.6 weight percent of the matrix glass composition.

$TiO_2$ particle size is also important in achieving hiding by light scattering. In general, the particle diameter should be about half the wavelength of the light to be scattered. In the case of titanium dioxide, however, the particle diameter must be a little less than half the wavelength of the light. Since visible light varies in wavelength from (blue) 400 millimicrons to (red) 700 millimicrons and ultraviolet light is in the range of 4 to 390 millimicrons, no single optimum size exists for the most efficient scattering of light. While titanium dioxide particles of completely uniform crystalline size cannot be obtained, their size distribution and average particle size can be controlled. Average particle size diameters of 0.2 to 0.35 micron are most efficient for visible light, while particles of 0.01 to 0.1 micron are suitable for ultraviolet light. We have found by the process of this invention that both the size and distribution of pigment particles can be advantageously controlled by the conditions of recrystallization of the $TiO_2$ and $ZrO_2$ from the glass matrix.

In practically adapting the solid-state process of this invention in accordance with one adaptation, dissolution of $TiO_2$ in a molten alkali-alkaline earth-fluoro-boro-silicate glass is conventionally brought about by charging a desired mixture of suitable inorganic oxides, minerals, fluorides or salts to a smelter and smelting the mixture of glass-forming components therein at temperatures ranging from 1100° C. to 1400° C. to form a homogeneous glass composition. For this purpose, a glass composition of substantially the following percentage (by weight) will prove effectively useful:

|  | Percentage by Weight |
|---|---|
| $SiO_2$ | 30–60 |
| $B_2O_3$ | 0–15 |
| $F_2$ | 0–7 |
| $TiO_2$ or $ZrO_2$ | 15–45 |
| $Al_2O_3$ | 0–15 |
| $R_2O$ group ($Na_2O$, $K_2O$, $Li_2O$) | 5–15 |
| RO group (CaO, MgO, BaO, ZnO) | 0–15 |
| $P_2O_5$ | 0–10 |

The molten glass product is then charged to an associated tank for quenching by sudden cooling, such as by immersion in cold water or other cooling media in the tank, or through sudden contact with a cooling surface. This induces a breaking up or shattering of the glass into friable condition to form small, granular particles and a frit product comprising substantially the composition above mentioned which, preferably, contains about 20–40% by weight of $TiO_2$. Specifically, the composition can comprise the following in which the percentage amounts of components given are by weight:

|  | Percentage by Weight |
|---|---|
| $SiO_2$ | 44.00 |
| $B_2O_3$ | 11.00 |
| $TiO_2$ | 25.00 |
| $K_2O$ | 4.00 |
| ZnO | 3.00 |
| $Na_2O$ | 9.00 |
| $P_2O_5$ | 4.00 |

Preferably, and to obtain optimum results under the invention and a pigment product containing properly spaced, properly shaped crystals of rutile, from about 1–10% by weight of $P_2O_5$ should be present as an essential component of the glass frit.

To develop requisite $TiO_2$ pigment particles of controlled, proper small size in the glass matrix, the frit particles are calcined at temperatures ranging from 600° C. to 1000° C., and preferably from 700° C. to 900° C., depending on the melting point of the glass composition being treated. Preferably, a temperature differential of from 400 to 700° C. below the smelting temperature of the glass is observed in this treatment. Depending upon the nature of the glass composition being treated and the calcination temperatures employed, the $TiO_2$ precipitated will be in the anatase or rutile crystalline structure, or will consist of mixtures of these phases. To insure presence of the preferred rutile form, temperatures above the anatase-to-rutile transition temperature of the composition are preferably resorted to. The time period of calcination will vary and can range from several minutes to several hours, with about 30 minutes' calcination at a temperature of 800° C. usually sufficing to provide $TiO_2$ particles in the glass with lengths and widths from .1 to 1 micron. With the same glass composition but employing a lower (700° C.) temperature and a longer time period of precipitation treatment, generation of equivalent pigmentary size $TiO_2$ particles will result. The same control is afforded when shorter times and higher temperatures are utilized with a given composition. The invention thus affords an effective method by which through control of the temperature used and time of treatment applied to a particular glass composition, one can advantageously control the $TiO_2$ particle size and crystallinity precipitated in such composition. Depending upon the composition of the glass and calcination temperature, the glass may or may not soften or fuse during the calcination treatment.

Following calcination of the metastable glass solution to recrystallize the $TiO_2$ to desired pigmentary size and state in the glass matrix, the product is suitably ground to reduce particle size and convert the glass particles to desired pigmentary fineness for the use intended, e.g. to a size generally ranging from 1–60 microns average diameter and preferably from 2–15 microns average diameter. This is effected by charging the product to a ball mill along with water or other electrolyte. In such grinding treatment conventional type milling equipment can be employed, including in addition to ball mills, a rod mill, roller mill, edge runner mill, or stirred and vibratory type of mills.

The final product will be found to consist of solid glass particles in desired pigmentary size range within each particle of which the precipitated $TiO_2$ or $ZrO_2$ in controlled small size is suitably embedded, encased, encapsulated or contained in dispersed state.

Advantageously, this invention affords an effective bypass of the many operations and quality controls now essential to $TiO_2$ pigment production through aqueous sulfate hydrolysis and titanium tetrachloride oxidation techniques. In addition, the pigments from this invention will afford a higher hiding power per unit of $TiO_2$ due to more effective light scattering; will practically eliminate a long standing problem of $TiO_2$ light degradation of the binder; and will provide a desired increased resistance upon exposure to exterior, adverse atmospheric conditions. Furthermore, the invention provides a novel system in which pigment particles operate to scatter light in highly pigmented systems with greater efficiency than otherwise possible, in which pigment particles are isolated from organic vehicles and in a relatively cheap solid inorganic vehicle.

To a clearer understanding of the invention the following illustrative examples are given wherein parts mentioned are by weight. These are not to be construed as limiting the underlying principles and scope of the invention.

Example I

A glass frit was prepared by fusing to molten state through heating to 1250° C. for 5½ hours in a fire-clay crucible, the following mixture:

|  | Parts by weight |
|---|---|
| Borax | 382 |
| Quartz | 840 |
| $NaNO_3$ | 156 |
| $Na_2SiF_6$ | 24 |
| $K_2SiF_6$ | 156 |
| $Na_2HPO_4$ | 64 |
| $TiO_2$ | 378 |
|  | 2000 |

The molten glass product was drawn off from the crucible and quenched with cold water in a separate vessel to obtain a friable glass frit containing 18½% $TiO_2$ by weight.

The frit particles from the quenching operation were dried and then calcined at 700° C. for 60 minutes in a conventional type furnace to nucleate, grow and recrystallize the TiO₂ particles uniformly within the glass matrix. The calcined product obtained was then cooled and dry-crushed to approximately 100 mesh and thereafter ground with water (in a ratio of 1 part glass to 3 parts H₂O) for 21 hours in a ball mill and until reduction of the charge to 1–10 micron diameter pigmentary particles resulted. To this water mixture 1 liter of sodium aluminate solution containing the equivalent of 40 parts of Al₂O₃ was added to effect pigment flocculation, and promote good filtration, the solution being stirred into the 2000 grams batch of ground material. The resulting mixture was then heated to 90° C. for 1 hour and subsequently cooled. Its pH was then adjusted to 7 by adding 1.2 normal HCl, after which filtering was undertaken and the pigment product was washed, dried and recovered.

Alkyd flat paints were prepared employing commercial grade rutile TiO₂ as a pigmenting ingredient with various extenders in the weight portions of 1:3. These paints were tinted with carbon black and a reflectance value measured in a Hunter Reflectometer with a Green Filter (described in J. Opt. Soc. of America, 50, 44–48, 1960). A similar paint was prepared for comparison, using the TiO₂ encased in glass composition obtained in accordance with this example. (See Table I below.) The paints were drawn down on standard white and black hiding power paper with 0.004 in. and 0.006 in. clearance applicator blades. After drying the films were saturated with a white mineral oil and contrast ratios determined. Using these data and the formula of Kubelka and Munk as described in National Bureau of Standards Research Paper #1026, light scattering coefficient values (S) were determined, which values indicate the true effective light scattering ability of TiO₂ in the film. The results of the comparison of glass encased TiO₂ pigments of this invention with equivalent Pigment Volume Concentration (PVC) formations extended with CaCO₃ or SiO₂ in paint films are shown in the following Table I wherein the higher values of S given signify a higher opacifying power per unit weight of TiO₂.

TABLE I

|  | A | B | C | D |
|---|---|---|---|---|
| TiO₂ pigment (Rutile) gms | 3 | 3 | 3 | 0 |
| SiO₂ extender, gms | 9 | 9 | | |
| CaCO₃ extender, gms | | | 9 | |
| TiO₂ encased in glass | | | | ¹12 |
| Carbon black, mg | 0 | 2 | 2 | 0 |
| Alkyd resin, mls | 5.95 | 5.95 | 5.0 | 5.75 |
| Naphtha, gms | 1.9 | 1.0 | 2.5 | 4.0 |
| PVC (pigm. vo. conc., dry film) | 66.5 | 66.5 | 70 | 70 |
| Film thickness on paper, in | .004 | .004 | .004 | .004 |
| Light scattering coeff. (S) dry value | 2.31 | 2.79 | 3.83 | 9.29 |
| Light scattering coeff. (S) oil value | 1.54 | 2.19 | 3.03 | 3.76 |
| Brightness, film thickness, .006 in.: | | | | |
| Dry value | .910 | .744 | .812 | .856 |
| Oiled value | .910 | .704 | .778 | .740 |

¹ Containing 2.2 gm. TiO₂.

Example II

A commercial titanium dioxide enameling frit containing 20% titanium dioxide by weight was crystallized by calcination of 800° C. for 15 mins. to yield rutile titanium dioxide particles in the glass matrix of a size well below normal commercial titanium dioxide pigment having a distinct tendency to scatter most of the blue light. The calcined product was then ground in water similar to the manner described in Example I from which a glass-encased TiO₂ pigment composition having a 5 micron average diameter particle size was obtained. The dispersion was then brought to a pH of 4 by means of HCl addition and was filtered. The composite pigment was compared with a standard grade anatase titanium dioxide pigment as a paper opacifier, using 100 parts of a 4% paper pulp and 5 cc. of 4% alum. The superiority of this glass encased pigment in producing dry opacity over such standard anatase was immediately evident. Waxed opacity was nearly as good as the anatase even though the titanium dioxide particle size was well below optimum for maximum opacifying efficiency. In addition, as judged by its observed blueness, the unwaxed paper exhibited a large increase in brightness when a white fluorescent dye was added with the paper pulp. This was indicative of the fact that the smaller particles of TiO₂ in the glass reflect rather than adsorb light needed to energize the dye.

Example III

Fifty grams of a commercial zirconia frit containing 18% ZrO₂ was crystallized by calcination at 750° C. for 15 minutes and then was ground for 16 hours in a ball mill. The dispersion was brought to a pH of 5.5 by HCl addition filtered, washed and dried. 7.2 gms. of the glass encased pigment having a particle size of 3 microns average diameter was dispersed in 8 cc. of an alkyd flat vehicle and dry paint film tested for opacity as in Example I on a Hunter Reflectometer with green filter. The results are shown in the following Table II. Compared to zircon ground in the same manner, this product showed at least 50% greater opacity both dry and oiled.

TABLE II

| | |
|---|---|
| Dry reflectance white | 0.860 |
| Dry reflectance black | 0.738 |
| Oiled reflectance white | 0.754 |
| Oiled reflectance black | 0.428 |
| Opacity dry | 0.858 |
| Opacity wet | 0.560 |

Example IV

A glass melt was prepared as in Example I by fusing together through heating the composition of reagents therein referred to. The resulting melt was quenched with water and portions of the product were calcined in a furnace at 750° C. for periods of 10, 20, 30, 40, 50, and 60 minutes, respectively. Each portion was then crushed to −100° mesh in a ball mill. The frits were then subjected to electronmicrography to determine the size rutile crystals precipitated in the glass matrix during the calcination. The material heated for 10 minutes was found to contain both anatase and rutile crystals in a size up to 0.1 micron and lower in diameter.

A larger batch of this frit material was prepared as described above, calcined at 750° C. for 10 minutes, and then ground for 20 hours in a pebble mill with water, using a ratio of 1 part frit to 3 of water. After separation by filtration, and being washed and dried, the glass pigment particles were in the 1 to 10 micron diameter size range.

A glass-acrylic lacquer was prepared by mixing the pigment material from the pebble milling operation with a 36% acrylic solids vehicle and in the ratio of 0.8 part frit to 1 part acrylic solids and the mixture was pebble milled for 26 hours. The milled, pigmented lacquer was then drawn down over standard black and white hiding power paper using a draw down blade with 8 mil clearance. An identical drawdown as made using the same vehicle without any pigmentation. Both drawdowns were air dried for one-half hour and then baked for one-half hour at 150° C. On examination, both films were found to be essentially transparent and nearly water white, however a very slight opalescence was noted in the pigmented film. Another pair of draw downs, using first a pigmented and then an unpigmented vehicle, were made, but this time over a substrate pattern which fluoresced in both near and far ultraviolet. These were dried and baked in the same manner, and were examined under both near and far ultraviolet light sources. The fluorescent pattern was clearly visible under the unpigmented film but failed to show under the encased-TiO₂ pigmented film. In effect, a lacquer opaque to ultraviolet and transparent to visible light was obtained. Accelerated weathering tests revealed the glass matrix pigment in the lacquer to be superior to the unpigmented lacquer as well as to a lacquer pigmented with normal pigmentary rutile.

The glass matrix in which the 0.1 micron $TiO_2$ crystals had been embedded had substantially the same refractive index as the acrylic vehicle. Hence, the glass itself produced no opacity. The crystals of rutile dispersed in the glass were too small to scatter visible light efficiently and so were also essentially transparent to visible light. At the shorter wavelengths of ultraviolet light, however, the smaller (0.01$\mu$ and less) crystals of rutile were much more efficient in scattering and so formed an efficient pigment, opaque to ultraviolet light. Heretofore, the effective use of this phenomenon has proved impractical because of the difficulty in dispersing discrete particles of this small size. The fixed dispersion of the rutile in the glass matrix in accordance with this invention overcomes this problem. A further difficulty in ultilizing titanium dioxide in the indicated size range arises from its high level of catalytic activity which causes rapid vehicle degradation. Surrounding the rutile crystals with a glass matrix effectively prevents this. A better match between the refractive index of vehicle and glass through adjustment of glass and vehicle composition should result in a film which is even more transparent to visible light.

While described as applied to the specific embodiments shown in the examples, the invention is not limited thereto. Thus, while specific amounts of titanium dioxide or zirconium oxide have been mentioned as useful in said examples, such amounts generally can range from 5% to 45%, by weight, and preferably from 25% to 40%. Likewise, these pigmenting substances can be used either alone or in various combinations or admixture with each other or with various prior $TiO_2$ or other pigmenting ingredients in adapting them to use.

Again, while production of pigmenting glass particles containing $TiO_2$ and/or $ZrO_2$ dispersed and stabilized in a glass matrix is especially contemplated, a variety of colored composite products can also be obtained in the invention. Use is therefore contemplated of various types and amounts of colored metal oxides commonly employed in enamel glass preparation which effectively impart a desired coloration to the final glass encased pigment product. Examples of the useful coloring agents include the oxides of cobalt, nickel, manganese, etc. These can be incorporated in small amounts in the glass batch together with the $TiO_2$ and other components. Preferably, only those types and amounts of coloring agents or pigments are used which do not adversely affect the $TiO_2$ or $ZrO_2$ crystallization in accordance with this invention.

As is known in the formulation of procelain enamel, compositions adjustments to within certain ranges must be made, but a number of the materials employed therein can be varied. Similarly, in the practice of this invention use in generally contemplated, in such proportions and ratios as may be desired, or well-known glass-forming oxides, principally those of silica ($SiO_2$), boric oxide ($B_2O_3$) and the various glass modifiers and fluxes, including specifically the oxides, carbonates, or nitrates of sodium or potassium; magnesium and barium carbonates; aluminum oxide or hydrate, etc.; all of which are utilized in glass or enamel glass manufacture.

We claim:
1. An opacifying pigment composition consisting essentially of a particulate, solid, transparent glass matrix having a refractive index of between 1.45 and 1.65 and an average particle size range of from 1 to 60 microns diameter passing a U.S. Series No. 230 mesh screen, with the particles of said pigment having dispersed and embedded therein from about 10 to 35% by volume of a recrystallized, stabilized opacifying oxide of a metal selected from the group consisting of titanium and zirconium in the size range of from 0.01 to 1.0 micron average diameter, and the weight percent of recrystallized oxide particles being at least 70% of the total opacifying oxide present in the composition.

2. The product of claim 1 in which at least 25% of the opacifying pigment composition particles are in a size range of from 2 to 15 microns average diameter.

3. The product of claim 2 in which the opacifying oxide is $TiO_2$.

4. The product of claim 3 in which at least 80% of the recrystallized $TiO_2$ particles are in rutile crystallinity and the average diameter size of the opacifying oxide is in the range of from 0.1 to 0.3 micron, and the volume percent of recrystallized $TiO_2$ in the glass matrix ranges from 15 to 30%.

5. An ultraviolet light opacifying pigment composition consisting essentially of 10–35% by volume of recrystallized titanium dioxide dispersed, embedded, and stabilized in solid particles of a glass matrix, said pigmented glass particles being in a size ranging from 1–60 microns average diameter, said $TiO_2$ component being in the size range from .01 to .1 micron average diameter, and the weight percent of recrystallized $TiO_2$ particles being at least 70% of the total $TiO_2$ present.

6. A method for producing an opacifying pigment composition of claim 1 comprising calcining at temperatures ranging from 600–1000° C. a glass composition containing from about 15–45% by weight of a dissolved opacifying metal oxide selected from the group consisting of titanium and zirconium to precipitate, recrystallize, stabilize and disperse said opacifying oxide in a size range of from 0.01 to 1.0 micron average diameter in from about 10–35% by volume in said glass, the weight percent of oxide recrystallized being at least 70% of the total of said oxide present, and thereafter milling the stabilized glass matrix to an average particle size ranging from 1–60 microns in diameter.

7. The method of claim 6 in which the opacifying pigment composition contains from 15–30% by volume of $TiO_2$ and the calcination is effected at a temperature of from 700–900° C.

8. The method of claim 7 in which at least 25% of the opacifying pigment composition is milled to a particle size ranging from 2–15 microns average diameter.

References Cited

UNITED STATES PATENTS

| | | | |
|---|---|---|---|
| 1,343,447 | 6/1920 | Goldschmide | 106—300 |
| 2,795,506 | 6/1957 | Sweo et al. | 106—48 |
| 3,278,284 | 10/1966 | Van Dolah et al. | |

FOREIGN PATENTS

| | | |
|---|---|---|
| 647,205 | 4/1964 | Belgium. |
| 1,149,840 | 6/1963 | Germany. |
| 953,767 | 4/1964 | Great Britain. |
| 966,451 | 8/1964 | Great Britain. |

TOBIAS E. LEVOW, Primary Examiner

H. M. S. SNEED, Assistant Examiner

U.S. Cl. X.R.

106—52, 54, 48; 260—29